(12) United States Patent
Hagimoto (10) Patent No.: US 9,879,586 B2
(45) Date of Patent: Jan. 30, 2018

(54) ABNORMALITY DETECTION DEVICE FOR EXHAUST GAS PURIFICATION APPARATUS

(71) Applicant: Yuriko Hagimoto, Shizuoka-ken (JP)

(72) Inventor: Yuriko Hagimoto, Shizuoka-ken (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 214 days.

(21) Appl. No.: 14/649,713

(22) PCT Filed: Dec. 7, 2012

(86) PCT No.: PCT/JP2012/081776
§ 371 (c)(1),
(2) Date: Jun. 4, 2015

(87) PCT Pub. No.: WO2014/087536
PCT Pub. Date: Jun. 12, 2014

(65) Prior Publication Data
US 2015/0315950 A1 Nov. 5, 2015

(51) Int. Cl.
*F01N 11/00* (2006.01)
*F01N 3/023* (2006.01)
(Continued)

(52) U.S. Cl.
CPC .............. *F01N 11/00* (2013.01); *F01N 3/021* (2013.01); *F01N 3/023* (2013.01); *F01N 3/025* (2013.01);
(Continued)

(58) Field of Classification Search
CPC ..................................... F01N 11/00
(Continued)

(56) References Cited

U.S. PATENT DOCUMENTS 8,689,543 B2 * 4/2014 Numata ............... F01N 3/0253
60/285
2004/0122583 A1 * 6/2004 Plote .................... F02D 41/0052
701/108
(Continued)

FOREIGN PATENT DOCUMENTS

| CN | 101400876 A | 4/2009 |
| CN | 102052127 A | 5/2011 |

(Continued)

OTHER PUBLICATIONS

English Translation of JP 2007315275 Dec. 2007.*

*Primary Examiner* — Peter Macchiarolo
*Assistant Examiner* — Alexander Mercado
(74) *Attorney, Agent, or Firm* — Finnegan, Henderson, Farabow, Garrett & Dunner, LLP (57) ABSTRACT

An object of the present invention is to distinguish and detect an abnormality of SCRF and an abnormality of a diffusing device in a system in which a diffusing device is provided for an exhaust gas passage between a filter (SCRF) including an SCR catalyst carried thereon and a reducing agent addition valve. In the present invention, it is judged that which one of abnormalities of any clogging-up of SCRF caused by PM, any breakage of SCRF, and any abnormality of a diffusing device occurs, on the basis of at least any one of a difference between a NOx purification rate of an SCR catalyst carried on SCRF and a predetermined NOx purification rate and a difference between a PM amount flowing out from SCRF and a predetermined outflow PM amount, when a difference, which is provided between an exhaust gas pressure difference as a difference between an exhaust gas pressure on an upstream side from a reducing agent addition valve and an exhaust gas pressure on a downstream side (Continued)

from SCRF and a predetermined exhaust gas pressure difference, exceeds a certain amount.

2 Claims, 4 Drawing Sheets

(51) Int. Cl.
    *F01N 3/20*            (2006.01)
    *F01N 3/10*            (2006.01)
    *F01N 3/28*            (2006.01)
    *F01N 9/00*            (2006.01)
    *F01N 3/021*          (2006.01)
    *F01N 3/025*          (2006.01)
    *F01N 3/035*          (2006.01)
    *F01N 13/00*          (2010.01)

(52) U.S. Cl.
    CPC ............. *F01N 3/035* (2013.01); *F01N 3/103* (2013.01); *F01N 3/208* (2013.01); *F01N 3/2066* (2013.01); *F01N 3/2892* (2013.01); *F01N 9/00* (2013.01); *F01N 13/009* (2014.06); *F01N 13/0097* (2014.06); *F01N 2240/20* (2013.01); *F01N 2250/02* (2013.01); *F01N 2550/02* (2013.01); *F01N 2550/04* (2013.01); *F01N 2550/05* (2013.01); *F01N 2560/026* (2013.01); *F01N 2560/05* (2013.01); *F01N 2560/07* (2013.01); *F01N 2560/08* (2013.01); *F01N 2610/02* (2013.01); *F01N 2900/1406* (2013.01); *F01N 2900/1606* (2013.01); *F01N 2900/1621* (2013.01); *Y02T 10/24* (2013.01); *Y02T 10/47* (2013.01)

(58) Field of Classification Search
    USPC ...................................................... 73/114.75
    See application file for complete search history.

(56) References Cited

U.S. PATENT DOCUMENTS

| | | | | |
|---|---|---|---|---|
| 2005/0109021 A1* | 5/2005 | Noirot | ................ | B01D 53/9409 60/295 |
| 2005/0223701 A1* | 10/2005 | Sato | ..................... | F01N 3/0235 60/295 |
| 2006/0000201 A1* | 1/2006 | Iizuka | .................. | F01N 3/0231 60/286 |
| 2006/0010857 A1* | 1/2006 | Hu | ........................ | F01N 13/011 60/286 |
| 2006/0086080 A1* | 4/2006 | Katogi | .................. | F01N 3/035 60/278 |
| 2006/0248877 A1* | 11/2006 | Nagel | .................. | B01D 53/944 60/278 |
| 2007/0012034 A1* | 1/2007 | Yahata | ................... | F01N 3/023 60/295 |
| 2007/0079601 A1* | 4/2007 | Hirata | .................. | F01N 3/2066 60/286 |
| 2007/0101700 A1* | 5/2007 | Masaki | .............. | B01F 3/04049 60/286 |
| 2007/0113544 A1* | 5/2007 | Nishina | ................. | F01N 3/2066 60/286 |
| 2007/0144152 A1 | 6/2007 | Lueders | | |
| 2007/0178025 A1* | 8/2007 | Opris | .................. | B01D 53/9431 422/177 |
| 2007/0209333 A1* | 9/2007 | Kondou | ............ | B01D 46/0086 55/282.3 |
| 2007/0251214 A1* | 11/2007 | Nishino | ................. | F01N 11/00 60/277 |
| 2008/0148715 A1* | 6/2008 | Osumi | ............... | B01D 53/9409 60/295 |
| 2008/0155972 A1* | 7/2008 | Driscoll | ................. | F01N 3/023 60/299 |
| 2008/0202101 A1* | 8/2008 | Driscoll | ................. | F01N 3/035 60/286 |
| 2008/0229931 A1* | 9/2008 | Katsuyama | ........ | B01D 46/0078 96/417 |
| 2008/0264045 A1* | 10/2008 | Hara | ..................... | F01N 3/0222 60/295 |
| 2009/0025372 A1* | 1/2009 | Onodera | ............... | F01N 3/0235 60/286 |
| 2009/0056316 A1* | 3/2009 | Haseyama | ........... | B01D 53/944 60/286 |
| 2009/0064665 A1* | 3/2009 | Iizuka | .................... | F01N 3/023 60/286 |
| 2009/0113875 A1* | 5/2009 | Miyake | .................. | F01N 3/0253 60/277 |
| 2009/0133385 A1* | 5/2009 | Ono | ........................ | F01N 9/002 60/277 |
| 2009/0235644 A1* | 9/2009 | Wu | ..................... | B01D 53/9495 60/285 |
| 2009/0249768 A1* | 10/2009 | Asanuma | ................ | B01D 53/90 60/286 |
| 2010/0063659 A1* | 3/2010 | Ogiso | ...................... | B60K 6/48 701/22 |
| 2010/0132337 A1* | 6/2010 | Hirata | ................... | B01D 46/42 60/286 |
| 2010/0139258 A1* | 6/2010 | Hackett | ................. | F01N 3/2066 60/299 |
| 2011/0030343 A1* | 2/2011 | Kiser | ...................... | F01N 3/208 60/274 |
| 2011/0030358 A1* | 2/2011 | Kato | ..................... | F01N 3/0814 60/317 |
| 2011/0035136 A1* | 2/2011 | Niimi | ..................... | B60K 6/445 701/110 |
| 2011/0107743 A1* | 5/2011 | Ranganathan | ...... | B01F 3/04049 60/295 |
| 2011/0165040 A1* | 7/2011 | Huang | ................. | B29C 47/8805 422/616 |
| 2011/0173953 A1* | 7/2011 | Neels | ..................... | F01N 3/0253 60/274 |
| 2012/0047883 A1* | 3/2012 | Kamiya | ................. | E02F 9/2066 60/311 |
| 2012/0324841 A1* | 12/2012 | Nishijima | ............... | F01N 3/021 55/282.3 |
| 2013/0025264 A1* | 1/2013 | Nagaoka | .......... | B01D 53/9477 60/285 |
| 2013/0058833 A1* | 3/2013 | Onodera | ................ | F01N 3/035 422/111 |
| 2013/0067891 A1* | 3/2013 | Hittle | .................... | F01N 3/103 60/274 |
| 2013/0086890 A1* | 4/2013 | Noma | ................... | F02D 41/029 60/277 |
| 2013/0091831 A1* | 4/2013 | Noma | ................... | F01N 3/0235 60/311 |
| 2013/0199495 A1* | 8/2013 | Wakabayashi | ....... | F02D 13/0261 123/348 |
| 2013/0227936 A1* | 9/2013 | Takahashi | ............. | E02F 9/2235 60/297 |
| 2013/0312616 A1* | 11/2013 | Shibamori | ............ | E02F 9/2095 96/419 |
| 2014/0165543 A1* | 6/2014 | Takebayashi | ........... | F02D 29/04 60/311 |
| 2014/0260511 A1* | 9/2014 | Nemer | ................ | G01N 33/0006 73/1.06 |
| 2014/0318112 A1* | 10/2014 | Solbrig | ................... | F01N 3/208 60/324 |
| 2014/0352280 A1* | 12/2014 | Qi | ......................... | F01N 3/2066 60/274 |
| 2015/0037219 A1* | 2/2015 | Moran | .................... | F01N 3/103 422/171 |
| 2015/0128566 A1* | 5/2015 | Osumi | .................. | B01D 53/9418 60/274 |
| 2015/0128576 A1* | 5/2015 | Osumi | .................... | F01N 3/035 60/287 |
| 2015/0358091 A1* | 12/2015 | Sappok | ................. | H04B 17/309 455/67.11 |
| 2016/0061079 A1* | 3/2016 | Wentzel | ................... | F01N 3/208 60/274 |

(56) References Cited

U.S. PATENT DOCUMENTS

| | | | |
|---|---|---|---|
| 2016/0160727 A1* | 6/2016 | Isada | F01N 3/2066 60/301 |
| 2016/0169077 A1* | 6/2016 | Srinivasan | F02C 9/00 60/274 |
| 2016/0194995 A1* | 7/2016 | Weiss | F01N 3/2892 60/324 |

FOREIGN PATENT DOCUMENTS

| | | | |
|---|---|---|---|
| JP | 2007-170388 | | 7/2007 |
| JP | 2007-292013 | | 11/2007 |
| JP | 2007-315275 | | 12/2007 |
| JP | 2007315275 A | * | 12/2007 |
| JP | 2011-33001 | | 2/2011 |
| JP | 2011-185167 | | 9/2011 |

* cited by examiner

ABNORMALITY DETECTION DEVICE FOR EXHAUST GAS PURIFICATION APPARATUS

CROSS-REFERENCE TO RELATED APPLICATIONS

This application is a national phase application of International Application No. PCT/JP2012/081776, filed Dec. 7, 2012, and claims the priority of, the content of which is incorporated herein by reference.

TECHNICAL FIELD

The present invention relates to an abnormality detection device for detecting an abnormality (abnormal situation or malfunction) of an exhaust gas purification apparatus for an internal combustion engine.

BACKGROUND ART

A filter is provided as an exhaust gas purification apparatus for an exhaust gas passage of an internal combustion engine in some cases. The filter traps the particulate matter (hereinafter referred to as "PM") contained in the exhaust gas.

Patent Literature 1 discloses a system in which a pressure difference sensor (differential pressure sensor) is provided for outputting a signal corresponding to a difference between the exhaust gas pressure provided on the upstream side from a filter and the exhaust gas pressure provided on the downstream side from the filter (pressure difference between the front and the back of the filter). In Patent Literature 1, the pressure difference sensor is connected via a pressure introducing tube to the exhaust gas passage on the upstream side from the filter and the exhaust gas passage on the downstream side from the filter. Then, the PM accumulation amount accumulated on the filter is estimated by utilizing the output of the pressure difference sensor. Further, Patent Document 1 discloses a technique in which the state of the filter is detected by using the amount of change of the pressure in an intake manifold and the amount of change of the pressure difference between the front and the back of the filter.

Further, a filter has been also developed, in which a selective catalytic reduction NOx catalyst (hereinafter referred to as "SCR catalyst") is carried thereon. When a reducing agent is supplied, the SCR catalyst selectively reduces NOx contained in the exhaust gas. The filter, which carries the SCR catalyst as described above, is hereinafter referred to as "SCRF".

Patent Literature 2 discloses a system in which an aqueous urea solution is supplied via a nozzle from the upstream side to SCRF provided for an exhaust gas passage. In this case, urea is hydrolyzed, and thus ammonia is produced. Then, NOx is reduced by an SCR catalyst by using ammonia as a reducing agent. Further, in Patent Literature 2, a pressure difference sensor is provided for detecting the pressure difference between the front and the back of SCRF.

PRIOR ART LITERATURES

Patent Literatures

Patent Literature 1: Japanese Patent Application Laid-Open No. 2007-292013A;

Patent Literature 2: Japanese Patent Application Laid-Open No. 2007-170388A

SUMMARY OF THE INVENTION

Problems to be Solved by the Invention

A reducing agent addition valve, which adds the reducing agent into the exhaust gas, is provided on the upstream side from SCRF in the exhaust gas passage. The reducing agent, which is added from the reducing agent addition valve, flows into SCRF together with the exhaust gas, and thus the reducing agent is supplied to the SCR catalyst carried on SCRF.

In this procedure, when the reducing agent is widely diffused in the exhaust gas flowing into SCRF, NOx can be reduced more efficiently by the SCR catalyst. Therefore, a diffusing device for diffusing the reducing agent is provided for the exhaust gas passage between the reducing agent addition valve and SCRF in some cases.

An object of the present invention is to distinguish and detect an abnormality of SCRF and an abnormality of a diffusing device in a system in which a diffusing device is provided for an exhaust gas passage between a reducing agent addition valve and SCRF as described above.

Means for Solving the Problems

In the present invention, it is judged that which one of abnormalities of any breakage of SCRF, any clogging-up of SCRF caused by PM, and any abnormality of a diffusing device occurs, on the basis of at least any one of a difference between a NOx purification rate of an SCR catalyst carried on SCRF and a predetermined NOx purification rate and a difference between a PM amount flowing out from SCRF and a predetermined outflow PM amount, when a difference, which is provided between an exhaust gas pressure difference as a difference between an exhaust gas pressure on an upstream side from a reducing agent addition valve and an exhaust gas pressure on a downstream side from SCRF and a predetermined exhaust gas pressure difference, exceeds a certain amount.

According to the present invention, there is provided an abnormality detection device for an exhaust gas purification apparatus, for detecting an abnormality of the exhaust gas purification apparatus comprising:

a filter which is provided for an exhaust gas passage of an internal combustion engine and which traps particulate matter contained in an exhaust gas, the filter including a selective catalytic reduction NOx catalyst carried thereon;

a reducing agent addition valve which is provided for the exhaust gas passage on an upstream side from the filter and which adds a reducing agent into the exhaust gas; and a diffusing device which is provided for the exhaust gas passage between the filter and the reducing agent addition valve and which diffuses the reducing agent contained in the exhaust gas, the abnormality detection device for the exhaust gas purification apparatus comprising:

a judging unit which judges that which one of abnormalities of any breakage of the filter, any clogging-up of the filter caused by the particulate matter, and any abnormality of the diffusing device occurs, on the basis of at least any one of a difference between a NOx purification rate of the selective catalytic reduction NOx catalyst carried on the filter and a predetermined NOx purification rate and a difference between a particulate matter amount flowing out from the filter and a predetermined outflow PM amount, when a difference, which is provided between an exhaust gas pressure difference as a difference between an exhaust gas pressure on an upstream side from the reducing agent addition valve and an exhaust gas pressure on a downstream side from the filter and a predetermined exhaust gas pressure difference, exceeds a certain amount.

If any one of the breakage of SCRF, the clogging-up of SCRF caused by PM, and the abnormality of the diffusing device (clogging-up by PM or breakage) occurs, the exhaust gas pressure difference, which is the difference between the exhaust gas pressure on the upstream side from the reducing agent addition valve and the exhaust gas pressure on the downstream side from SCRF, is greatly changed as compared with that provided in the normal state. Further, if the abnormality as described above occurs, the values of the NOx purification rate of the SCR catalyst carried on SCRF (hereinafter simply referred to as "NOx purification rate" in some cases) and the PM amount flowing out from SCRF (hereinafter referred to as "outflow PM amount" in some cases) behave in a manner depending on the content of the abnormality.

Accordingly, in the present invention, it is judged that which one of abnormalities of the breakage of SCRF, the clogging-up of SCRF caused by PM, and the abnormality of the diffusing device occurs, on the basis of at least any one of the difference between the NOx purification rate and the predetermined NOx purification rate and the difference between the outflow PM amount and the predetermined outflow PM amount, when the difference, which is provided between the exhaust gas pressure difference the predetermined exhaust gas pressure difference, exceeds the certain amount.

In this case, the predetermined exhaust gas pressure difference may be either an exhaust gas pressure difference provided at a point in time earlier than a present time by a predetermined time, or an estimated value of the exhaust gas pressure difference provided if it is assumed that the filter and the diffusing device are normal. The predetermined NOx purification rate may be either a NOx purification rate provided at the point in time earlier than the present time by the predetermined time, or an estimated value of the NOx purification rate provided if it is assumed that the filter and the diffusing device are normal. The predetermined outflow PM amount may be either a predetermined outflow PM amount provided at the point in time earlier than the present time by the predetermined time, or an estimated value of the predetermined outflow PM amount provided if it is assumed that the filter and the diffusing device are normal.

If the breakage of SCRF occurs, then the exhaust gas pressure difference is greatly decreased as compared with that provided in the normal state, and the outflow PM amount is greatly increased as compared with that provided in the normal state. Accordingly, in the present invention, the judging unit may judge that the breakage of SCRF occurs if an amount of increase of the outflow PM amount with respect to the predetermined outflow PM amount is larger than a threshold value when the difference between the exhaust gas pressure difference and the predetermined exhaust gas pressure difference exceeds the certain amount.

Further, if the clogging-up of SCRF caused by PM occurs, the exhaust gas pressure difference is greatly increased as compared with that provided in the normal state. However, in this case, the NOx purification rate is not greatly changed as compared with that provided in the normal state. Accordingly, in the present invention, the judging unit may judge that the clogging-up of SCRF caused by PM occurs if an amount of decrease of the NOx purification rate with respect to the predetermined NOx purification rate is not more than a threshold value when the difference between the exhaust gas pressure difference and the predetermined exhaust gas pressure difference exceeds the certain amount.

Further, if the abnormality of the diffusing device occurs, the exhaust gas pressure difference is greatly decreased or increased as compared with that provided in the normal state. In this case, the NOx purification rate is greatly lowered as compared with that provided in the normal state, but the outflow PM amount is not greatly changed as compared with that provided in the normal state. Accordingly, in the present invention, the judging unit may judge that the abnormality of the diffusing device occurs if an amount of decrease of the NOx purification rate with respect to the predetermined NOx purification rate is larger a threshold value and an amount of increase of the outflow PM amount with respect to the predetermined outflow PM amount is smaller than a threshold value when the difference between the exhaust gas pressure difference and the predetermined exhaust gas pressure difference exceeds the certain amount.

Advantageous Effect of the Invention

According to the present invention, it is possible to distinguish and detect the abnormality of SCRF and the abnormality of the diffusing device in a system in which the diffusing device is provided for the exhaust gas passage between the reducing agent addition valve and SCRF.

EMBODIMENTS FOR CARRYING OUT THE INVENTION

An explanation will be made below on the basis of the drawings about a specified embodiment of the present invention. For example, the dimension or size, the material, the shape, and the relative arrangement of each of constitutive parts or components described in the embodiment of the present invention are not intended to limit the technical scope of the invention only thereto unless specifically noted.
<First Embodiment>

An explanation will now be made about a case in which the exhaust gas purification system for the internal combustion engine according to the present invention is applied to a diesel engine for driving a vehicle. However, the internal combustion engine according to the present invention is not limited to the diesel engine, which may be, for example, a gasoline engine.

(Schematic Arrangement of Intake/Exhaust System)

Figure 1:
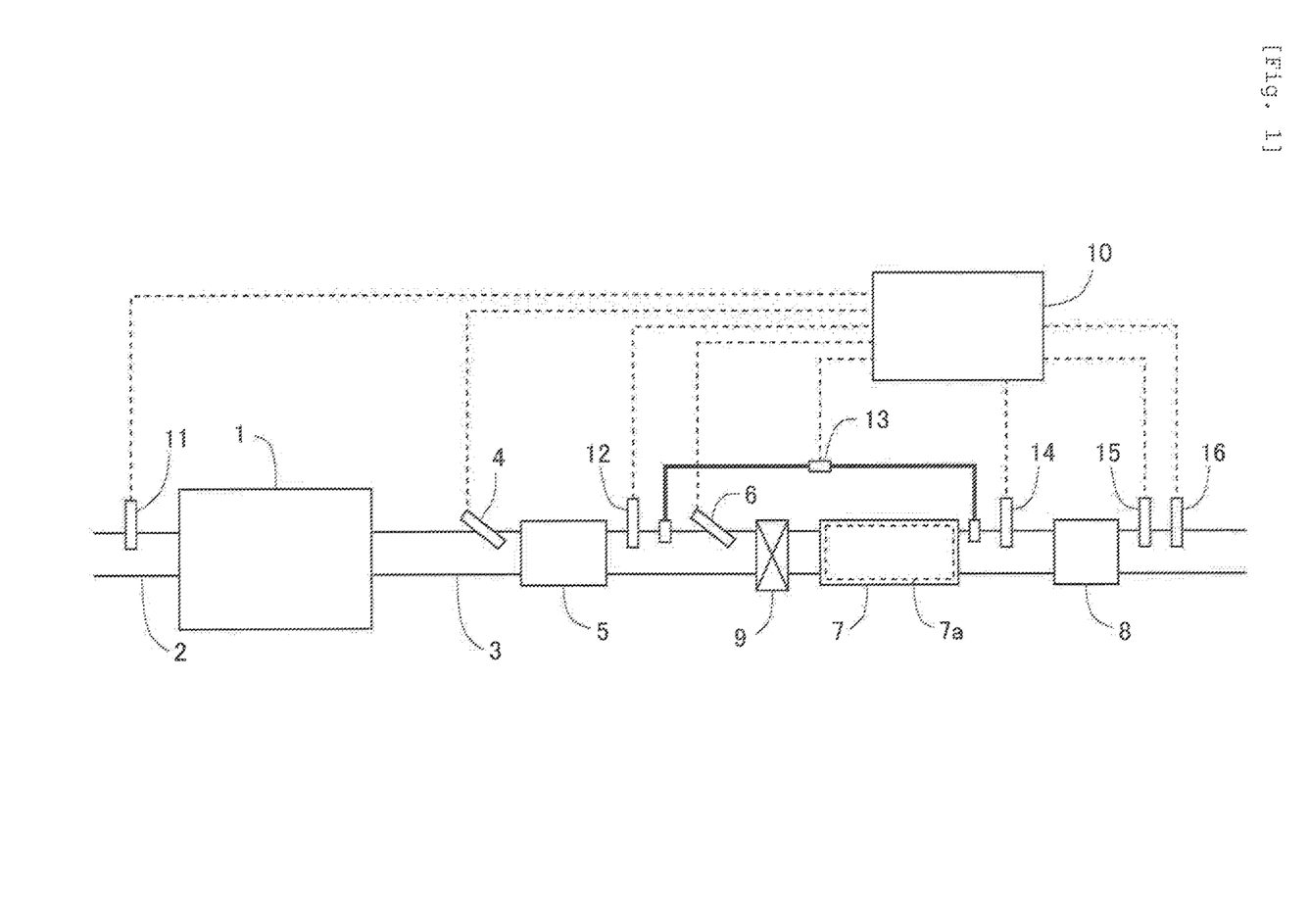
FIG. 1 shows a schematic arrangement of an intake/exhaust system of an internal combustion engine according to an embodiment.

FIG. 1 shows a schematic arrangement of an intake/exhaust system of the internal combustion engine according to this embodiment. The internal combustion engine 1 is the diesel engine for driving the vehicle. An intake gas passage 2 and an exhaust gas passage 3 are connected to the internal combustion engine 1. An air flow meter 11, which detects the intake air amount of the internal combustion engine 1, is provided for the intake gas passage 2.

A fuel addition valve 4, a pre-catalyst (front stage catalyst) 5, a urea addition valve 6, a diffusing device 9, SCRF 7, and a post-catalyst (back stage catalyst) 8 are provided for the exhaust gas passage 3 in an order as referred from the upstream side along with the flow of the exhaust gas. Further, a first NOx sensor 12 is provided between the pre-catalyst 5 and the urea addition valve 6 in the exhaust gas passage 3. An exhaust gas temperature sensor 14 is provided between SCRF 7 and the post-catalyst 8 in the exhaust gas passage 3. A second NOx sensor 15 and a PM sensor 16 are provided on the downstream side from the post-catalyst 8 in the exhaust gas passage 3. Further, a pressure difference sensor 13 is provided for the exhaust gas passage 3.

The pre-catalyst 5 is an oxidation catalyst. However, the pre-catalyst 5 may be any catalyst other than the oxidation catalyst provided that the catalyst has the oxidizing function. The fuel addition valve 4 adds the fuel into the exhaust gas in order to supply the fuel to the pre-catalyst 5. Note that the fuel can be also supplied to the pre-catalyst 5 without providing the fuel addition valve 4 such that the subsidiary fuel injection is executed at a timing at which the injected fuel is not subjected to the combustion and the injected fuel is discharged in an unburned state to the exhaust gas passage 3 in the internal combustion engine 1.

SCRF 7 is constructed such that an SCR catalyst 7a is carried on a wall flow type filter for trapping PM contained in the exhaust gas. The SCR catalyst 7a reduces NOx contained in the exhaust gas by using ammonia as the reducing agent. The urea addition valve 6 adds an aqueous urea solution into the exhaust gas in order to supply urea as an ammonia precursor to SCRF 7. Urea, which is added from the urea addition valve 6, is hydrolyzed, and thus ammonia is produced. The produced ammonia is once adsorbed to the SCR catalyst 7a carried on SCRF 7. Further, the adsorbed ammonia behaves as the reducing agent, and NOx contained in the exhaust gas is reduced.

In this embodiment, the urea addition valve 6 corresponds to the reducing agent addition valve according to the present invention. However, the reducing agent addition valve according to the present invention may be a device which adds urea as liquid or solid. Further, the reducing agent addition valve according to the present invention may be a device which adds ammonia as gas, liquid, or solid. Further, when the SCR catalyst 7a is a catalyst which reduces NOx by using HC and/or CO as the reducing agent, the reducing agent addition valve according to the present invention may be a fuel addition valve.

Figure 2:
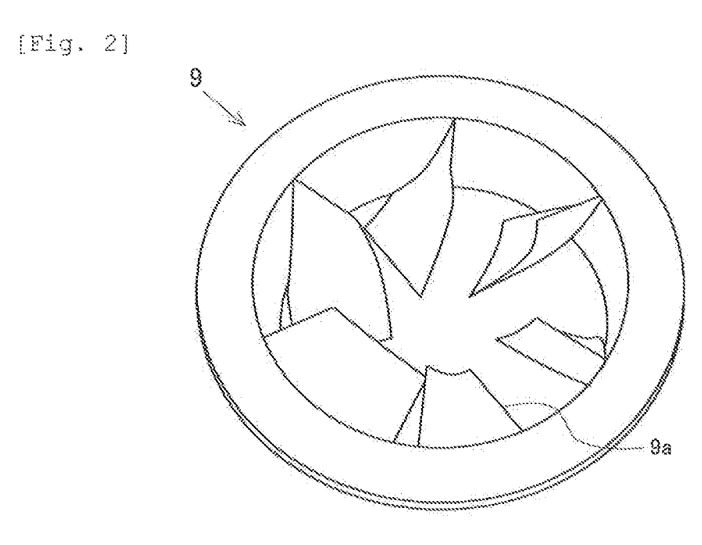
FIG. 2 shows a perspective view illustrating a schematic arrangement of a diffusing device according to the embodiment.

The diffusing device 9 is a device which is provided in order to diffuse urea contained in the exhaust gas added from the urea addition valve 6. FIG. 2 shows a perspective view illustrating a schematic arrangement of the diffusing device 9. The diffusing device 9 is provided with a plurality of blades or vanes 9a which are inclined with respect to the flow direction of the exhaust gas. The blades 9a protrude from the inner wall surface of the passage toward the central axis, and the blades 9a are installed at equal intervals about the central axis of the passage. According to the arrangement as described above, the exhaust gas, which flows toward the diffusing device 9 from the upstream side in the axial direction of the exhaust gas passage 3, collides with the blades 9a. Thus, the exhaust gas advances along with the blades 61, and thus the traveling direction of the exhaust gas is changed. Accordingly, the swirling flow of the exhaust gas, which swirls about the center of the central axis of the exhaust gas passage 3, is generated. As a result, urea contained in the exhaust gas is diffused.

When urea is diffused in the exhaust gas flowing into SCRF 7, it is thereby possible to adsorb ammonia in a wider range of the SCR catalyst 7a. Therefore, it is possible to facilitate the reduction of NOx by the SCR catalyst 7a. Note that the shape and the number of the blades 9a shown in FIG. 2 are referred to by way of example. It is also allowable to adopt any other shape and any other number thereof. Further, the arrangement of the diffusing device according to the present invention is not limited to the arrangement as shown in FIG. 2. It is also possible to apply any other well-known arrangement.

The post-catalyst 8 is an oxidation catalyst. However, the post-catalyst 8 may be any other catalyst which has the oxidizing function. Alternatively, the post-catalyst 8 may be a catalyst which is constructed by combining an oxidation catalyst and an SCR catalyst for reducing NOx contained in the exhaust gas by using ammonia as the reducing agent. In this case, for example, the oxidation catalyst may be formed by carrying a noble metal (precious metal) such as platinum (Pt) or the like on a carrier made of a material of aluminum oxide ($Al_2O_3$), zeolite or the like, and the SCR catalyst may be formed by carrying a base metal (nonprecious metal) such as copper (Cu), iron (Fe) or the like on a carrier made of a material of zeolite. Owing to the fact that the post-catalyst 8 is the catalyst constructed as described above, it is possible to oxidize HC, CO, and ammonia contained in the exhaust gas. Further, it is possible to produce NOx by oxidizing a part of ammonia, and it is also possible to reduce produced NOx by using excessive ammonia as the reducing agent.

The first NOx sensor 12 and the second NOx sensor 15 are sensors which detect NOx contained in the exhaust gas. The first NOx sensor 12 detects NOx contained in the exhaust gas flowing out from the pre-catalyst 5, i.e., NOx flowing into SCRF 7. The second NOx sensor 15 detects NOx contained in the exhaust gas flowing out from the post-catalyst 8, i.e., NOx flowing out from SCRF 7.

The exhaust gas temperature sensor 14 is a sensor which detects the temperature of the exhaust gas. The PM sensor 16 is a sensor which detects PM contained in the exhaust gas. The PM sensor 16 detects PM contained in the exhaust gas flowing out from the post-catalyst 8, i.e., PM flowing out from SCRF 7. As for the PM sensor 16, for example, it is possible to use a PM sensor constructed to have a pair of electrodes as the sensor element. In the case of the PM sensor constructed as described above, the electric characteristic, which is exemplified, for example, by the resistance value between the pair of electrodes, is changed depending on the PM amount accumulated on the sensor element. Then, the output value of the PM sensor is changed depending on the change of the electric characteristic.

The pressure difference sensor 13 detects the difference between the exhaust gas pressure which is provided between the pre-catalyst 5 and the urea addition valve 6 in the exhaust gas passage 3 and the exhaust gas pressure which is provided between SCRF 7 and the post-catalyst 8 (the difference in the exhaust gas pressure will be hereinafter referred to as "exhaust gas pressure difference"). Those connected to the pressure difference sensor 13 are the other end of an upstream side pressure introducing tube having one end connected to the exhaust gas passage 3 between the pre-catalyst 5 and the urea addition valve 6 and the other end of a downstream side pressure introducing tube having one end connected to the exhaust gas passage 3 between SCRF 7 and the post-catalyst 8. Note that the following arrangement or procedure is also available. That is, pressure sensors, each of which detects the pressure of the exhaust gas, are provided respectively between the pre-catalyst 5 and the urea addition valve 6 in the exhaust gas passage 3 and between SCRF 7 and the post-catalyst 8, in place of the pressure difference sensor 13. The exhaust gas pressure difference is calculated on the basis of the output values of the pressure sensors.

An electronic control unit (ECU) 10 is provided in combination with the internal combustion engine 1. Various sensors, which include, for example, the air flow meter 11, the first NOx sensor 12, the second NOx sensor 15, the exhaust gas temperature sensor 14, and the PM sensor 16, are electrically connected to ECU 10. Then, output signals of various sensors are inputted into ECU 10. Further, ECU 10 estimates the temperature of the SCRF 7 on the basis of the output value of the exhaust gas temperature sensor 14.

Further, ECU 10 calculates the PM amount flowing out from SCRF 7 on the basis of the output value of the PM sensor 16. Further, ECU 10 calculates the NOx purification rate of the SCR catalyst 7a carried on SCRF 7 (rate of NOx amount reduced by the SCR catalyst 7a with respect to the NOx amount flowing into SCRF 7), on the basis of the output values of the first NOx sensor 12 and the second NOx sensor 15. Note that the NOx amount flowing into SCRF 7 can be estimated on the basis of, for example, the operation state of the internal combustion engine 1 without providing the first NOx sensor 12, and the NOx purification rate of the SCR catalyst 7a can be calculated by using the estimated value as well.

Further, the fuel addition valve 4 and the urea addition valve 6 are electrically connected to ECU 10. Then, the devices as described above are controlled by ECU 10.

For example, ECU 10 executes the fuel addition from the fuel addition valve 4, and thus ECU 10 realizes the filter regeneration process in order to remove PM accumulated on SCRF 7. When the fuel is added from the fuel addition valve 4, the fuel is supplied to the pre-catalyst 5. When the fuel is oxidized by the pre-catalyst 5, the heat of combustion (heat of oxidation) is generated. The exhaust gas, which flows into SCRF 7, is heated by the heat of combustion. Accordingly, the temperature of SCRF 7 is raised. When the filter regeneration process is executed, then the fuel addition amount added from the fuel addition valve 4 is controlled, and thus the temperature of SCRF 7 is raised to a predetermined filter regeneration temperature (for example, 600 to 650° C.) at which the oxidation of PM is facilitated. As a result, PM accumulated on SCRF 7 is oxidized and removed.

(Method for Detecting Abnormality of Exhaust Gas Purification Apparatus)

Any breakage, which includes, for example, any crack and any dissolution loss, occurs in some cases in SCRF 7 resulting from, for example, any excessive temperature increase caused by the oxidation of PM. Further, in SCRF 7, any clogging-up occurs in some cases on account of any excessive accumulation of PM. If the breakage of SCRF 7 occurs, the pressure difference between the front and the back of SCRF 7 is greatly decreased as compared with that provided in the normal state. On the other hand, if the clogging-up caused by PM occurs in SCRF 7, the pressure difference between the front and the back of SCRF 7 is greatly increased as compared with that provided in the normal state. Therefore, in order to detect the abnormality of SCRF 7 such as the breakage or the clogging-up caused by PM, it is effective to use the pressure difference between the front and the back of SCRF 7.

On the other hand, in this embodiment, in order to supply urea to the SCR catalyst 7a carried on SCRF 7, the aqueous urea solution is added into the exhaust gas from the urea addition valve 6 on the upstream side from SCRF 7. Therefore, if the upstream side pressure introducing tube, which is provided to introduce the exhaust gas pressure on the upstream side from SCRF 7 into the pressure difference sensor, is connected to the exhaust gas passage 3 on the upstream side from SCRF 7 and on the downstream side from the urea addition valve 6 in order to detect the pressure difference between the front and the back of SCRF 7, it is feared that the deposit or precipitate, which is deposited from the aqueous urea solution, may adhere to the upstream side pressure introducing tube and/or the pressure difference sensor. If the deposit or precipitate as described above adheres to the upstream side pressure introducing tube and/or the pressure difference sensor, it is difficult to correctly detect the pressure difference between the front and the back of SCRF 7.

Therefore, in this embodiment, the upstream side pressure introducing tube, which is provided to introduce the exhaust gas pressure on the upstream side from SCRF 7 into the pressure difference sensor 13, is connected on the upstream side as compared with the urea addition valve 6 in the exhaust gas passage 3. Accordingly, the deposit or precipitate, which is deposited from the aqueous urea solution, can be suppressed from adhering to the upstream side pressure introducing tube and/or the pressure difference sensor 13.

However, in the case of the arrangement as described above, the exhaust gas pressure difference, which is detected by the pressure difference sensor 13, is the difference between the exhaust gas pressure which is provided on the upstream side from the urea addition valve 6, i.e., on the upstream side from the diffusing device 9 and the exhaust gas pressure which is provided on the downstream side from SCRF 7. Therefore, the exhaust gas pressure difference, which is detected by the pressure difference sensor 13, is changed not only when any abnormality occurs in SCRF 7 but also when any abnormality occurs in the diffusing device 9.

In other words, the exhaust gas pressure difference is greatly decreased as compared with that provided in the normal state when the breakage of the diffusing device 9 occurs in the same manner as when the breakage of SCRF 7 occurs. Further, the exhaust gas pressure difference is greatly increased as compared with that provided in the normal state when the clogging-up of the diffusing device 9 occurs on account of the accumulation of PM on the diffusing device 9 in the same manner as when the clogging-up of SCRF 7 caused by PM occurs. Therefore, it is difficult to distinguish and detect the abnormality of SCRF 7 and the abnormality of the diffusing device 9 on the basis of only the change of the exhaust gas pressure difference detected by the pressure difference sensor 13.

Accordingly, in this embodiment, the abnormality detection is performed on the basis of at least any one of the changes of the NOx purification rate of the SCR catalyst 7a and the PM amount flowing out from SCRF 7 (outflow PM amount) in addition to the change of the exhaust gas pressure difference detected by the pressure difference sensor 13. Thus, the breakage of SCRF 7, the clogging-up of SCRF 7 caused by PM, and the abnormality of the diffusing device 9 are distinguished and detected. If the breakage of SCRF 7, the clogging-up of SCRF 7 caused by PM, or the abnormality of the diffusing device 9 occurs, the values of the NOx purification rate and the outflow PM amount exhibit the behavior corresponding to the content of the abnormality, in addition to the fact that the exhaust gas pressure difference is greatly changed as compared with that provided in the normal state. Therefore, the respective abnormalities as described above can be distinguished and detected on the basis of the changes of these values.

(Flow of Abnormality Detection)

Figure 3:
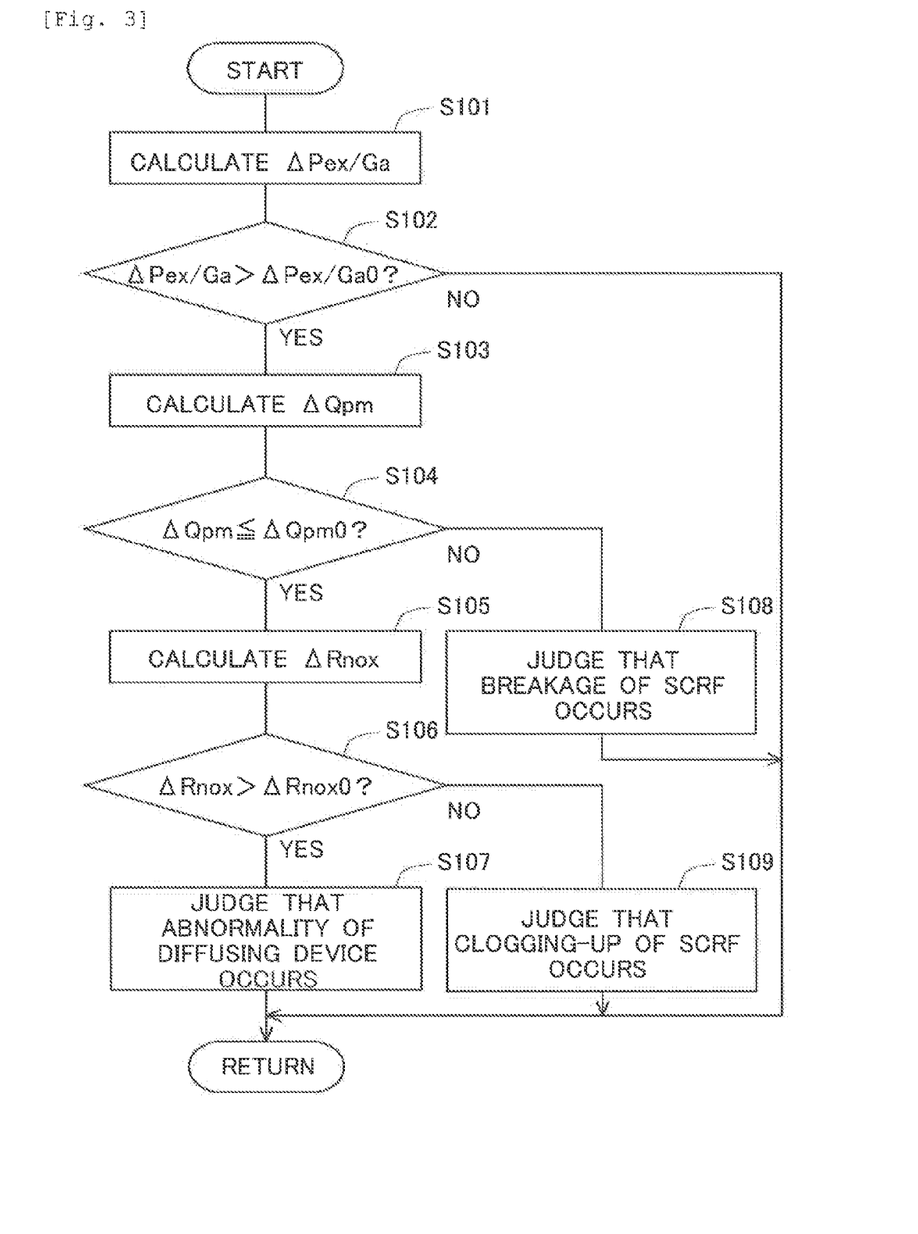
FIG. 3 shows a flow chart illustrating a flow of abnormality detection performed for an exhaust gas purification apparatus according to the embodiment.

An explanation will be made below on the basis of FIG. 3 about a flow of abnormality detection performed for the exhaust gas purification apparatus according to this embodiment. FIG. 3 shows a flow chart illustrating the flow of abnormality detection performed for the exhaust gas purification apparatus according to this embodiment. This flow is previously stored in ECU 10, and this flow is repeatedly executed at predetermined intervals.

In this flow, in Step S101, the value ΔPex/Ga is calculated such that the difference between the exhaust gas pressure difference provided at the present time detected by the pressure difference sensor 13 and the exhaust gas pressure difference provided at a point in time earlier than the present time by a predetermined time, i.e., the amount of change ΔPex of the exhaust gas pressure difference provided during the elapse of the predetermined time is divided by the intake air amount Ga detected by the air flow meter 11. In this procedure, the predetermined time is the time in which a certain extent of difference arises between the amount of change of the exhaust gas pressure difference provided when any abnormality occurs in SCRF 7 or the diffusing device 9 and the amount of change of the exhaust gas pressure difference provided in the normal state. The predetermined time is previously determined, for example, on the basis of an experiment.

Subsequently, in Step S102, it is judged whether or not the value ΔPex/Ga, which is calculated in Step 3101, is larger than a predetermined threshold value ΔPex/Ga0. In this procedure, the threshold value ΔPex/Ga0 is the upper limit value of a range in which it is possible to judge that any abnormality does not occur in any one of SCRF 7 and the diffusing device 9, i.e., a proper range. The threshold value ΔPex/Ga0 is the value which is decided depending on, for example, the estimated value of the PM accumulation amount of SCRF 7 provided if it is assumed that the operation state of the internal combustion engine 1 and SCRF 7 are normal. The threshold value ΔPex/Ga0 can be determined, for example, on the basis of an experiment. Note that the threshold value ΔPex/Ga0 may be a predetermined fixed value.

If the affirmative judgment is made in Step S102, the process of Step S103 is subsequently executed. On the other hand, if the negative judgment is made in Step S102, i.e., if ΔPex/Ga is not more than the predetermined threshold value ΔPex/Ga0 then it is possible to judge that any abnormality does not occur in any one of SCRF 7 and the diffusing device 9. In this case, the execution of this flow is once completed.

Note that the amount of change ΔPex itself of the exhaust gas pressure difference may be used as a parameter for the abnormality detection in place of the value ΔPex/Ga obtained by dividing the amount of change ΔPex of the exhaust gas pressure difference by the intake air amount Ga. However, the value of the exhaust gas pressure difference changes depending on the flow rate of the exhaust gas discharged from the internal combustion engine 1. Further, the flow rate of the exhaust gas discharged from the internal combustion engine 1 is correlated with the intake air amount Ga. Therefore, it is possible to raise the accuracy of the abnormality detection by using, as the parameter for the abnormality detection, the value ΔPex/Ga obtained by dividing the amount of change ΔPex of the exhaust gas pressure difference by the intake air amount Ga.

In Step S103, the amount of increase ΔQpm of the outflow PM amount provided at the present time calculated on the basis of the output value of the PM sensor 16 with respect to the outflow PM amount provided at the point in time earlier than the present time by the predetermined time is calculated. In other words, the amount of increase ΔQpm of the outflow PM amount is the amount of increase of the outflow PM amount provided during the period in which the predetermined time elapses.

Subsequently, in Step S104, it is judged whether or not the amount of increase ΔQpm of the outflow PM amount calculated in Step 3103 is not more than a predetermined threshold value ΔQpm0. If SCRF 7 is broken, PM flows out from the broken portion without being trapped. Therefore, the outflow PM amount is greatly increased as compared with that provided in the normal state. On the other hand, even when the clogging-up of SCRF 7 caused by PM or the abnormality of the diffusing device 9 occurs, the outflow PM amount is not greatly increased as compared with that provided in the normal state. In this procedure, the predetermined threshold value ΔQpm0 is the upper limit value of a range in which it is possible to judge that SCRF 7 is not broken, i.e., a proper range. The threshold value ΔQpm0 is the value which is decided depending on, for example, the operation state of the internal combustion engine 1 and/or the estimated value of the PM accumulation amount of SCRF 7 provided if it is assumed that SCRF 7 is normal. The threshold value ΔQpm0 can be determined, for example, on the basis of an experiment. Note that the threshold value ΔQpm0 may be a predetermined fixed value.

If the negative judgment is made in Step 104, i.e., if the amount of increase ΔQpm of the outflow PM amount is larger than the predetermined threshold value ΔQpm0, then the process of Step S108 is subsequently executed. In Step 3108, it is judged that the breakage of SCRF 7 occurs.

On the other hand, if the affirmative judgment is made in Step S104, the process of Step S105 is subsequently executed. In Step S105, the amount of decrease ΔRnox of the NOx purification rate provided at the present time calculated on the basis of the output values of the first NOx sensor 12 and the second NOx sensor 15 with respect to the NOx purification rate provided at the point in time earlier than the present time by the predetermined time is calculated. In other words, the amount of decrease ΔRnox of the NOx purification rate is the amount of decrease of the NOx purification rate provided during the period in which the predetermined time elapses.

Subsequently, in Step S106, it is judged whether or not the amount of decrease ΔRnox of the NOx purification rate calculated in Step S105 is larger than a predetermined threshold value ΔRnox0. If the abnormality of the diffusing device 9 occurs, urea is hardly diffused in the exhaust gas. As a result, the NOx purification rate is greatly lowered as compared with that provided in the normal state. On the other hand, even when the clogging-up of SCRF 7 caused by PM occurs, the NOx purification rate is not greatly lowered as compared with that provided in the normal state. In this procedure, the predetermined threshold value ΔRnox0 is the upper limit value of a range in which it is possible to judge that the diffusing device 9 is normal, i.e., a proper range. The threshold value ΔRnox0 is the value which is decided depending on, for example, the operation state of the internal combustion engine 1. The threshold value ΔRnox0 can be determined, for example, on the basis of an experiment. Note that the threshold value ΔRnox0 may be a predetermined fixed value.

Note that when the breakage of SCRF 7 occurs, the exhaust gas also tends to flow while being concentrated on the broken portion. Therefore, the NOx purification rate is greatly lowered as compared with that provided in the normal state. However, it is possible to judge that the breakage of SCRF 7 does not occur at the stage at which the process of Step S106 is executed.

If the affirmative judgment is made in Step S106, the process of Step S107 is subsequently executed. In Step S107, it is judged that the abnormality of the diffusing device 9 occurs. On the other hand, if the negative judgment is made in Step S106, i.e., if the amount of decrease ΔRnox of the NOx purification rate is not more than the predetermined threshold value ΔRnox0, then the process of Step S109 is subsequently executed. In Step S109, it is judged that the clogging-up of SCRF 7 caused by PM occurs.

According to the abnormality detection flow as described above, it is possible to distinguish and detect the breakage of SCRF 7, the clogging-up of SCRF 7 caused by PM, and the abnormality of the diffusing device 9.

(Modified Embodiment)

Figure 4:
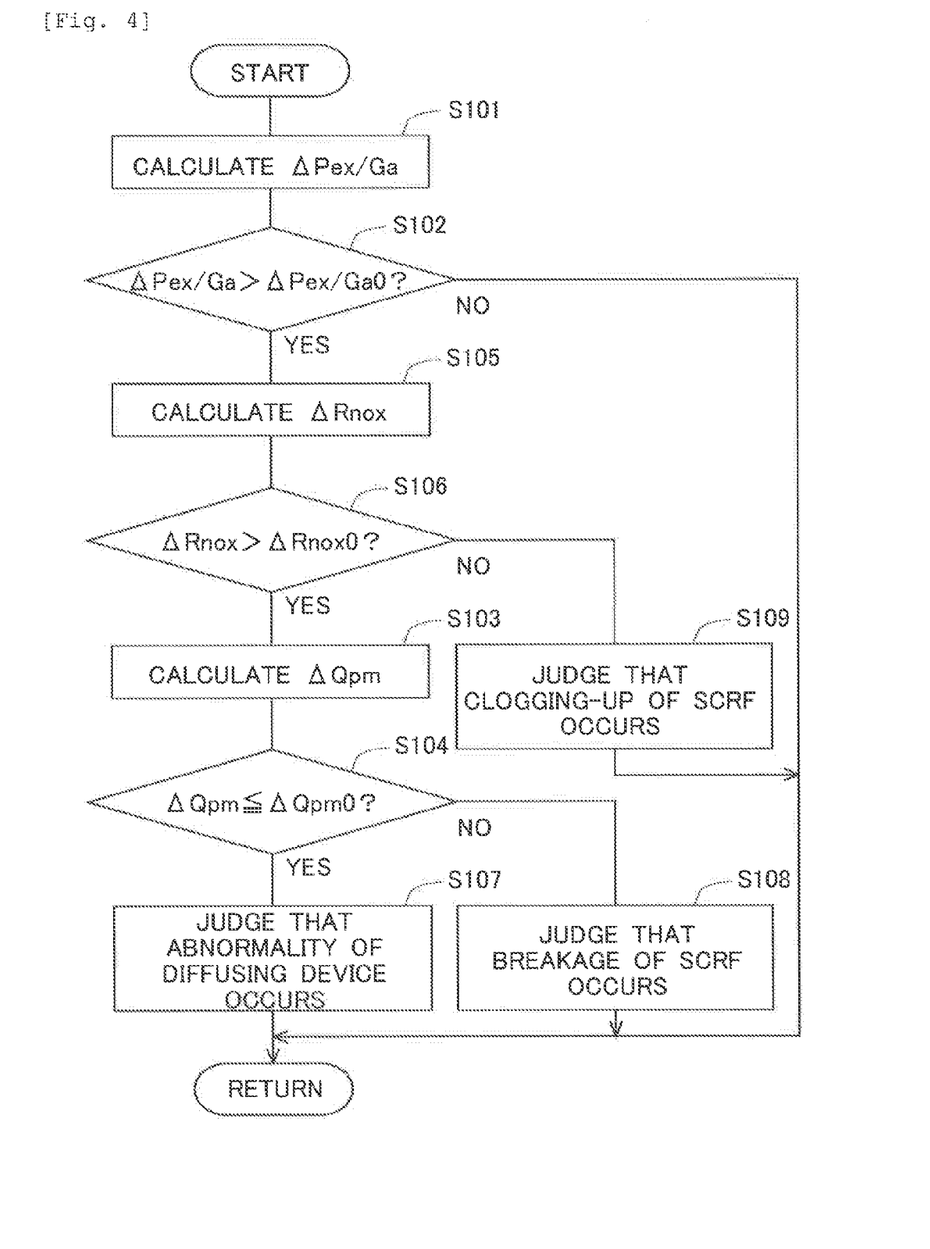
FIG. 4 shows a flow chart illustrating a flow of abnormality detection performed for the exhaust gas purification apparatus according to a modified embodiment of the embodiment.

FIG. 4 shows a flow chart illustrating a flow of abnormality detection performed for the exhaust gas purification apparatus according to a modified embodiment of the embodiment of the present invention. This flow is previously stored in ECU 10, and this flow is repeatedly executed at predetermined intervals.

In this flow, the order of the execution of Steps S103 and S104 and the execution of Steps S105 and S106 is reverse to the order illustrated in the flow shown in FIG. 3. In other words, in this flow, if the affirmative judgment is made in Step S102, the processes of Steps S105 and S106 are executed firstly.

Also in this case, if the amount of decrease ΔRnox of the NOx purification rate calculated in Step S105 is not more than the predetermined threshold value ΔRnox0, it is possible to judge that the clogging-up of SCRF 7 caused by PM occurs. Therefore, if the negative judgment is made in Step S106, the process of Step S109 is subsequently executed in the same manner as in the flow shown in FIG. 3.

On the other hand, if the affirmative judgment is made in Step S106, the processes of Steps S103 and S104 are executed. Also in this case, if the amount of increase ΔQpm of the outflow PM amount calculated in Step S103 is larger than the predetermined threshold value ΔQpm0, it is possible to judge that the breakage of SCRF 7 occurs. Further, if the amount of increase ΔQpm of the outflow PM amount calculated in Step S103 is not more than the predetermined threshold value ΔQpm0, it is possible to judge that the abnormality of the diffusing device 9 occurs. Therefore, if the affirmative judgment is made in Step S106, the process of Step S107 is subsequently executed. If the negative judgment is made, the process of Step S108 is subsequently executed.

When the abnormality detection flow is used as described above, it is thereby possible to distinguish and detect the breakage of SCRF 7, the clogging-up of SCRF 7 caused by PM, and the abnormality of the diffusing device 9 as well.

Note that in the abnormality detection flows according to the embodiment and the modified embodiment described above, it is also allowable that ΔPex, ΔQpm, and ΔRnox are differences between the values provided at the present time and the values provided in the normal state in relation to the exhaust gas pressure difference, the outflow PM amount, and the NOx purification rate respectively. In other words, ΔPex may be a difference between the exhaust gas pressure difference provided at the present time detected by the pressure difference sensor 13 and the estimated value of the exhaust gas pressure difference provided if it is assumed that the SCRF 7 and the diffusing device 9 are normal. Further, ΔQpm may be an amount of increase of the outflow PM amount provided at the present time calculated on the basis of the output value of the PM sensor 16 with respect to the estimated value of the outflow PM amount provided if it is assumed that SCRF 7 is normal. Furthermore, ΔRnox may be an amount of decrease of the NOx purification rate provided at the present time calculated on the basis of the output values of the first NOx sensor 12 and the second NOx sensor 15 with respect to the estimated value of the NOx purification rate provided if it is assumed that SCRF 7 and the diffusing device 9 are normal.

Note that the exhaust gas pressure difference provided if it is assumed that SCRF 7 and the diffusing device 9 are normal, the outflow PM amount provided if it is assumed that SCRF 7 is normal, and the NOx purification rate provided if it is assumed that SCRF 7 and the diffusing device 9 are normal can be estimated on the basis of, for example, the operation state of the internal combustion engine 1 and the estimated value of the PM accumulation amount of SCRF 7 provided if it is assumed that SCRF 7 is normal. The estimated values of these values may be previously determined, for example, on the basis of an experiment, and they may be stored beforehand as a map or a function in ECU 10.

Even in such a case, if ΔQpm is larger than the threshold value when the value ΔPex/Ga obtained by dividing the difference ΔPex of the exhaust gas pressure difference by the intake air amount Ga exceeds the threshold value, then it is possible to judge that the breakage of SCRF 7 occurs. Further, if ΔRnox is not more than the threshold value when the value ΔPex/Ga obtained by dividing the difference ΔPex of the exhaust gas pressure difference by the intake air amount Ga exceeds the threshold value, then it is possible to judge that the clogging-up of SCRF 7 caused by PM occurs. Furthermore, if ΔRnox is larger than the threshold value and ΔQpm is smaller than the threshold value when the value ΔPex/Ga obtained by dividing the difference ΔPex of the exhaust gas pressure difference by the intake air amount Ga exceeds the threshold value, then it is possible to judge that the abnormality of the diffusing device 9 occurs.

DESCRIPTION OF THE REFERENCE SIGNS

1: internal combustion engine
2: intake gas passage
3: exhaust gas passage
4: fuel addition valve
5: pre-catalyst
6: urea addition valve
7: filter (SCRF)
7a: selective catalytic reduction NOx catalyst (SCR catalyst)
8: post-catalyst
9: diffusing device
10: ECU
11: air flow meter
12: first NOx sensor
13: pressure difference sensor
14: exhaust gas temperature sensor
15: second NOx sensor
16: PM sensor

The invention claimed is:

1. An abnormality detection device for an exhaust gas purification apparatus, for detecting an abnormality of the exhaust gas purification apparatus comprising:
   a filter which is provided for an exhaust gas passage of an internal combustion engine and which traps particulate matter contained in an exhaust gas, the filter including a selective catalytic reduction NOx catalyst carried thereon;
   a reducing agent addition valve which is provided for the exhaust gas passage on an upstream side from the filter and which adds a reducing agent into the exhaust gas; and
   a diffuser which is provided for the exhaust gas passage between the filter and the reducing agent addition valve and which diffuses the reducing agent contained in the exhaust gas, the abnormality detection device for the exhaust gas purification apparatus comprising:
      an electronic control unit configured to judge which one of a clogging-up abnormality of the filter caused by the particulate matter and an abnormality of the diffuser occurs, on the basis of a difference between a NOx purification rate of the selective catalytic reduction NOx catalyst carried on the filter and a predetermined NOx purification rate, when:
         a difference between an exhaust gas pressure difference, as provided by a difference between an exhaust gas pressure on an upstream side from the reducing agent addition valve and an exhaust gas pressure on a downstream side from the filter, and a predetermined exhaust gas pressure difference exceeds a certain amount, and
         a difference between a particulate matter amount flowing out from the filter and a predetermined outflow particulate matter amount is not more than a predetermined threshold value,
      wherein the electronic control unit judges that the abnormality of the diffuser occurs if an amount of decrease of the NOx purification rate of the selective catalytic reduction NOx catalyst carried on the filter with respect to the predetermined NOx purification rate is larger a threshold value, when the difference between the exhaust gas pressure difference and the predetermined exhaust gas pressure difference exceeds the certain amount, and the difference, which is provided between the particulate matter amount flowing out from the filter and the predetermined outflow particulate matter amount, is not more than the predetermined threshold value.

2. An abnormality detection device for an exhaust gas purification apparatus, for detecting an abnormality of the exhaust gas purification apparatus comprising:
   a filter which is provided for an exhaust gas passage of an internal combustion engine and which traps particulate matter contained in an exhaust gas, the filter including a selective catalytic reduction NOx catalyst carried thereon;
   a reducing agent addition valve which is provided for the exhaust gas passage on an upstream side from the filter and which adds a reducing agent into the exhaust gas; and
   a diffuser which is provided for the exhaust gas passage between the filter and the reducing agent addition valve and which diffuses the reducing agent contained in the exhaust gas, the abnormality detection device for the exhaust gas purification apparatus comprising:
      an electronic control unit configured to judge which one of a clogging-up abnormality of the filter caused by the particulate matter and an abnormality of the diffuser occurs, on the basis of a difference between a NOx purification rate of the selective catalytic reduction NOx catalyst carried on the filter and a predetermined NOx purification rate, when:
         a difference between an exhaust gas pressure difference, as provided by a difference between an exhaust gas pressure on an upstream side from the reducing agent addition valve and an exhaust gas pressure on a downstream side from the filter, and a predetermined exhaust gas pressure difference exceeds a certain amount, and
      a difference between a particulate matter amount flowing out from the filter and a predetermined outflow particulate matter amount is not more than a predetermined threshold value,
      wherein the electronic control unit judges that the clogging-up of the filter caused by the particulate matter occurs if an amount of decrease of the NOx purification rate of the selective catalytic reduction NOx catalyst carried on the filter with respect to the predetermined NOx purification rate is not more than a threshold value, when the difference between the exhaust gas pressure difference and the predetermined exhaust gas pressure difference exceeds the certain amount, and the difference, which is provided between the particulate matter amount flowing out from the filter and the predetermined outflow particulate matter amount, is not more than the predetermined threshold value, and
   wherein the electronic control unit judges that the abnormality of the diffuser occurs if an amount of decrease of the NOx purification rate of the selective catalytic reduction NOx catalyst carried on the filter with respect to the predetermined NOx purification rate is larger the threshold value, when the difference between the exhaust gas pressure difference and the predetermined exhaust gas pressure difference exceeds the certain amount, and the difference, which is provided between the particulate matter amount flowing out from the filter and the predetermined outflow particulate matter amount, is not more than the predetermined threshold value.

* * * * *